United States Patent
Ebert et al.

(10) Patent No.: US 8,133,014 B1
(45) Date of Patent: Mar. 13, 2012

(54) TRIPLE ACTING RADIAL SEAL

(75) Inventors: Todd A Ebert, West Palm Beach, FL (US); John A Carella, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 470 days.

(21) Appl. No.: 12/542,495

(22) Filed: Aug. 17, 2009

Related U.S. Application Data

(60) Provisional application No. 61/089,824, filed on Aug. 18, 2008.

(51) Int. Cl.
*F01D 11/02* (2006.01)

(52) U.S. Cl. .............. 415/173.3; 415/173.5; 415/174.2; 415/174.5

(58) Field of Classification Search .............. 415/173.3, 415/173.4, 173.5, 174.2, 174.4, 174.5, 230, 415/231
See application file for complete search history.

(56) References Cited

U.S. PATENT DOCUMENTS

| | | | |
|---|---|---|---|
| 5,114,159 A * | 5/1992 | Baird et al. ................. 277/355 |
| 6,821,086 B1 * | 11/2004 | Brisson et al. ............. 415/174.2 |
| 2003/0082050 A1 * | 5/2003 | Aschenbruck et al. ..... 415/174.5 |
| 2004/0086381 A1 * | 5/2004 | Brisson et al. ............. 415/174.2 |
| 2004/0101403 A1 * | 5/2004 | Turnquist et al. .......... 415/174.2 |
| 2004/0247430 A1 * | 12/2004 | Brisson et al. ............. 415/174.2 |
| 2006/0210392 A1 * | 9/2006 | Enderby .................... 415/170.1 |
| 2007/0274829 A1 * | 11/2007 | Chevrette et al. ............ 415/231 |

* cited by examiner

*Primary Examiner* — Edward Look
*Assistant Examiner* — Christopher R Legendre
(74) *Attorney, Agent, or Firm* — John Ryznic

(57) ABSTRACT

A triple acting radial seal used as an interstage seal assembly in a gas turbine engine, where the seal assembly includes an interstage seal support extending from a stationary inner shroud of a vane ring, the interstage seal support includes a larger annular radial inward facing groove in which an outer annular floating seal assembly is secured for radial displacement, and the outer annular floating seal assembly includes a smaller annular radial inward facing groove in which an inner annular floating seal assembly is secured also for radial displacement. A compliant seal is secured to the inner annular floating seal assembly. The outer annular floating seal assembly encapsulates the inner annular floating seal assembly which is made from a very low alpha material in order to reduce thermal stress.

11 Claims, 3 Drawing Sheets

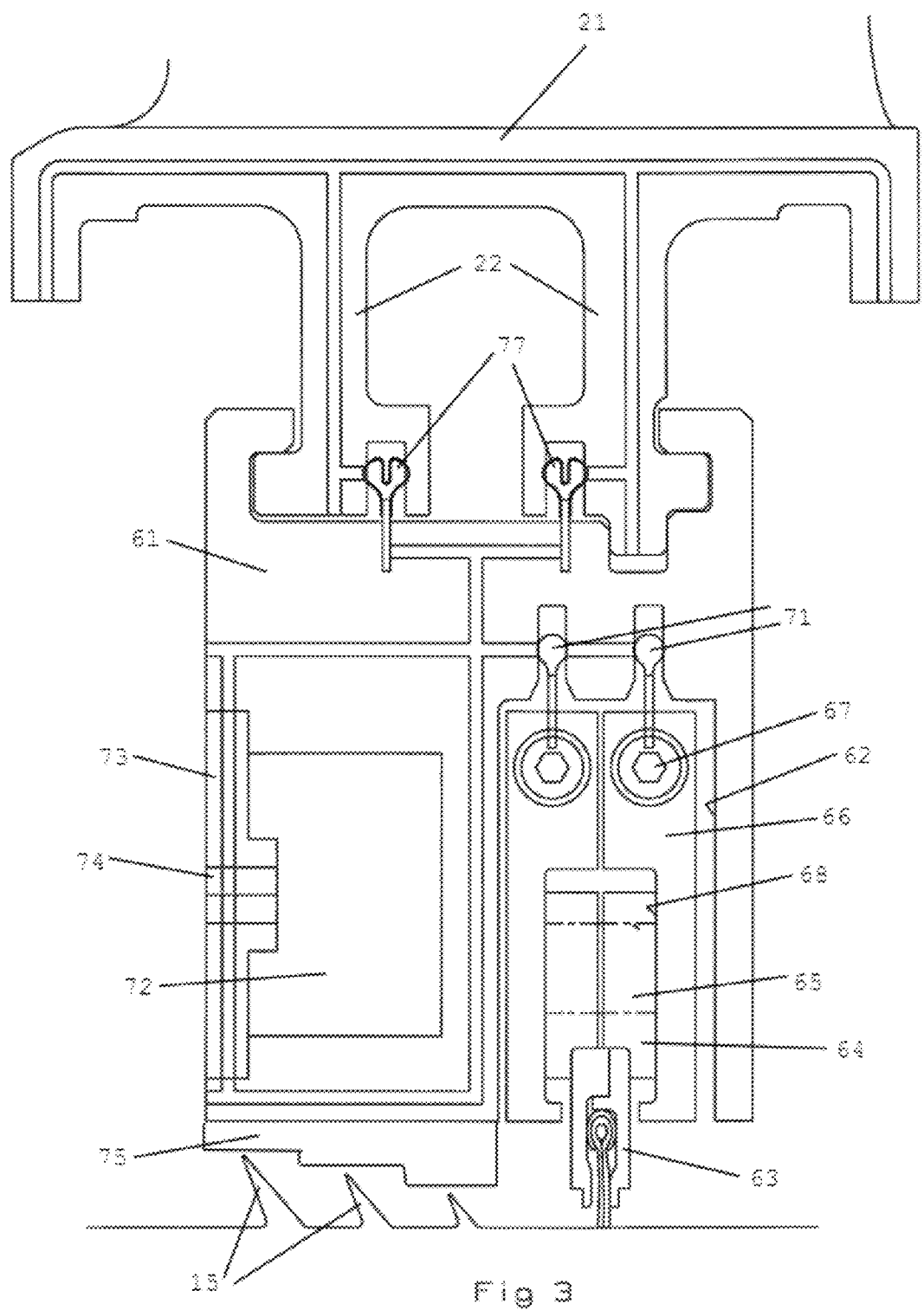

TRIPLE ACTING RADIAL SEAL

CROSS-REFERENCE TO RELATED APPLICATIONS

This application claims the benefit to an earlier filed Provisional Application 61/089,824 filed on Aug. 18, 2008 and entitled TRIPLE ACTING RADIAL SEAL.

FEDERAL RESEARCH STATEMENT

This invention was made with Government support under contract number DE-FG02-07ER84668 awarded by Department of Energy. The Government has certain rights in the invention.

BACKGROUND OF THE INVENTION

1. Field of the Invention

The present invention relates generally to a brush seal, and more specifically to a gas turbine engine with a brush seal.

2. Description of the Related Art including information disclosed under 37 CFR 1.97 and 1.98

In an industrial gas turbine engine, a turbine includes three or four rows or stages of stator vanes and rotor blades that guide and react with a hot gas flow to convert the energy from the gas flow into mechanical work by driving the turbine rotor shaft from which the rotor blades are connected to. As the hot gas flow passes through the stages, the pressure decreases as energy is extracted by the rotor blades. The rotor blades are positioned between adjacent stages of stator vanes. A seal is required between the rotor and the stator to prevent hot gas flow from leaking into the rim cavity or other areas outside of the main flow path in which the elevated temperature of the gas flow can affect other parts of the turbine such as the rotor disks. Also, the seals between the stages of vanes and blades prevent leakage of the higher pressure gas flow into a lower pressure gas flow at a downstream stage of the turbine.

Turbine stages typically use labyrinth seals or brush seals to limit leakage flow. Labyrinth seals provide a good seal at high rotational speeds and can allow for slight amounts of rub against a honey comb surface. Brush seals make good seals for low rotational speeds, but wear relatively fast at higher speeds. One major problem with an industrial gas turbine engine and these interstage seals in the turbine is when transients occur. In a transient, the engine operates from a cold condition to a steady state operating condition, or goes from one condition to another condition in which the rotor shaft and the casing changes temperatures that cause relative radial displacement between the shaft and casing. This relative radial displacement will cause significant gap clearances in the interstage seals to open or close such that the leakage flow is significantly increased or a rubbing occurs that will damage or wear out the seal prematurely.

One example of this transient is when an engine is shift down from a steady state operation to a stopped condition. The casing will cool quicker than the rotor shaft, so the casing will close down on the rotor shaft. In another transient condition, the stopped engine will be restarted. The casing will heat up quicker than the rotor shaft so that the casing will thermally grow in a radial direction faster than the rotor shaft will. Thus, the clearance gaps during transients change such that large gaps are produced or rubbing is produced.

BRIEF SUMMARY OF THE INVENTION

It is an object of the present invention to provide for a compliant seal in an interstage seal assembly of a gas turbine engine that will not wear during engine transients.

It is another object of the present invention to provide for a compliant seal in an interstage seal assembly that includes a very brittle and delicate low alpha material that will not develop high thermal stress loads due to exposure to the hot gas flow leakage.

It is another object of the present invention to provide for an interstage seal for a gas turbine engine that will offer a large clearance at engine start and close the gap as the rotor heats up during engine operation.

It is another object of the present invention to provide for a compliant seal in an interstage seal assembly that will produce no wear during engine transients.

The above objectives and more are achieved with the triple acting radial seal of the present invention which is used in a interstage seal assembly in a gas turbine engine. The triple acting radial seal includes an interstage seal support formed of several segments that extend from an inner shroud of a stator vane assembly. The interstage seal support includes a larger annular radial inward facing groove in which an outer floating seal assembly formed is mounted for radial displacement. The outer floating seal assembly includes a smaller annular radial inward facing groove in which an inner floating seal assembly formed is mounted also for radial displacement. A compliant seal, such as a brush or leaf seal, is secured to the inner end of the inner floating seal assembly. The inner floating seal assembly is made of a very low alpha material that limits any radial displacement of the compliant seal due to thermal differences. The inner floating seal assembly is also encapsulated within the smaller annular radial inward facing groove of the outer floating seal assembly so that the hot gas leakage flow surrounds the entire low alpha material so that thermal stresses are limited.

With the triple acting radial seal of the present invention used in an interstage seal assembly for a gas turbine engine, a large gap clearance can be formed at engine start and the gap closed as the rotor heats up. No wear of the compliant seal is produced during engine transients because of the encapsulated low alpha material used to directly secure the brush seal.

BRIEF DESCRIPTION OF THE SEVERAL VIEWS OF THE DRAWINGS

FIG. 3 shows a cross section view of the brush seal for the third embodiment of the present invention.

DETAILED DESCRIPTION OF THE INVENTION

Figure 1:
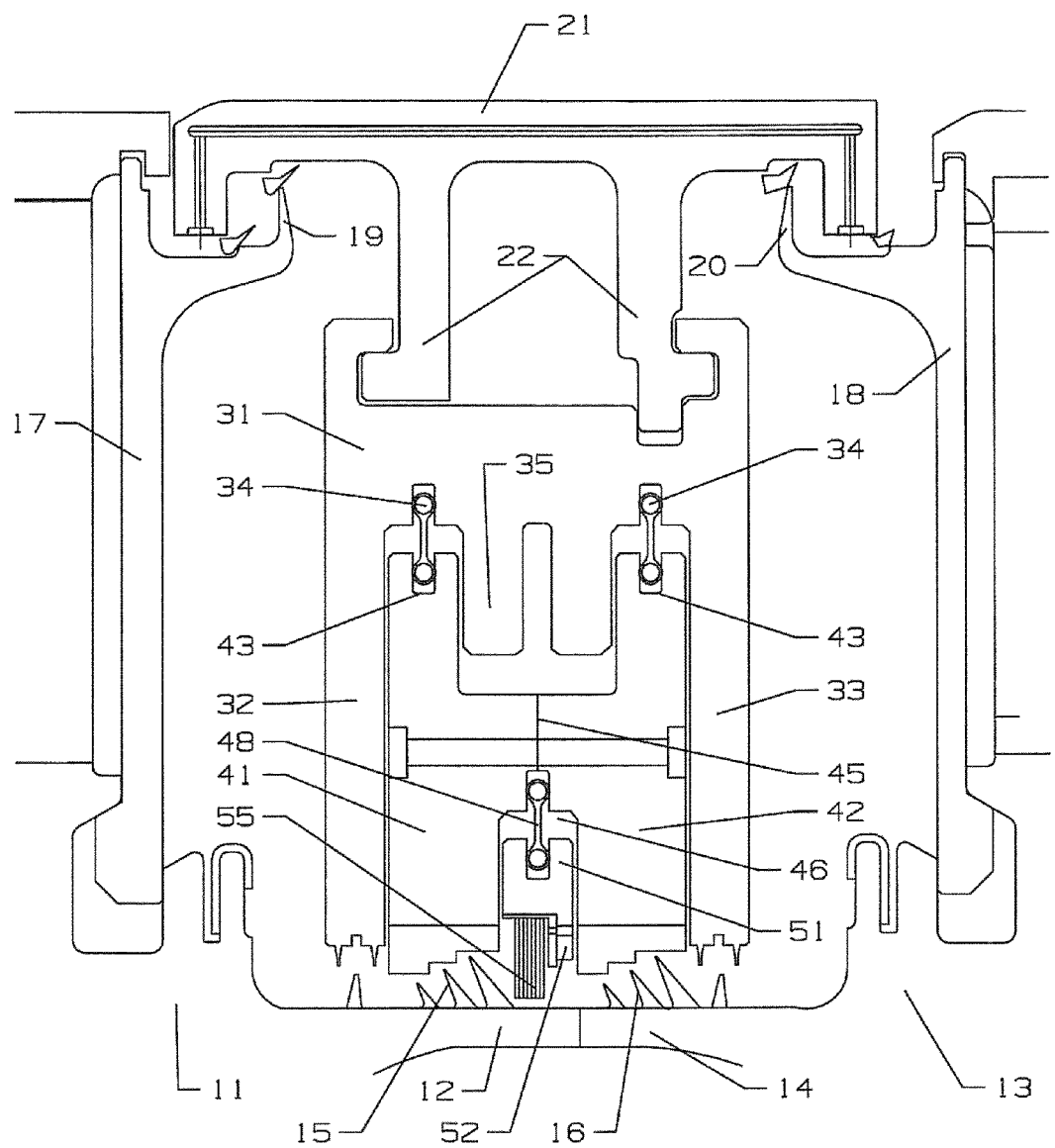
FIG. 1 shows a cross section view of the brush seal for the first embodiment of the present invention.

FIG. 1 shows the brush seal and its support of the present invention used in a gas turbine engine to form a seal between an inner shroud of a stator vane and a rotating part on a rotor seal rack formed between the two rotor disks and underneath of the stator vane. FIG. 1 shows a first rotor disk 11 of the turbine with a seal rack extension 12 and a second rotor disk 13 with a seal rack extension 14 extending toward the first seal rack extension 12 to form the sealing surface for a brush seal. Labyrinth seal teeth 15 and 16 extend radial outward from the seal rack extensions 12 and 14 to form a labyrinth (lab) seal with the brush seal assembly of the stator vane assembly. Cover plates 17 and 18 are secured to the two rotor disks 11 and 13 and include radial upward extending labyrinth seal teeth 19 and 20 that form a seal with the stationary inner shroud 21 of the stator vane assembly.

The guide vane assembly is positioned between the two rotor disks and includes a lower or inner shroud section 21 with hooks 22 extending downward toward the rotor disk in which a hard mounted turbine interstage seal 31 is connected. The hard mounted turbine interstage seal 31 is formed of multiple segments that form a full 360 degree annular ring. The hard mounted turbine interstage seal 31 includes two outer legs 32 and 33 extending inward to define an inner cavity in which an interstage seal support 41 and 42 slides, and includes two inner legs 35. Two seal grooves are formed in the seal 31 to static-static seals such as receive dog bone seals 34. Two inner legs 35 form two cavities in which a floating interstage seal support 41 and 42 slides in a radial (up and down in this figure) direction. Two seal grooves 43 that extend outward are aligned with the seal grooves in the turbine interstage seal 31 to form static-static seal grooves. The floating interstage seal support is formed of a forward side 41 and an aft side 42 in which each of the two sides is formed from two 180 degree segments. The floating interstage seal support segments 41 and 42 are made of INCO 909 honeycomb in order to provide for a low coefficient of thermal expansion. The seal holder assembly 41 and 42 provides for a tight steady state clearance.

A stepped labyrinth seal radially offsets the high velocity jets to remove impingement on the bristle pack. The floating interstage seal support assembly 41 and 42 can slide in a radial direction within the inner cavity defined within the turbine interstage seal 31. Bolt holes extending axially through the two seal holders 41 and 42 allow for a threaded bolt to secure the two holders 41 and 42 together to form a single floating interstage seal support. The split design removes blind assembly concerns. The lower faces of the two seal support segments 41 and 42 are stepped to form a stepped labyrinth seal with the lab seal teeth 15 and 16 that extend from the rotor disk seal rack extensions 12 and 14. However, other rotary seals can be used and non-stepped seal interfaces could be used without departing from the spirit or scope of the present invention.

The floating interstage seal support 41 and 42 form a second inner cavity in which an encapsulated brush seal holder 51 is positioned. Seal grooves are formed on the top of the brush seal holder 51 and the inner side of the floating interstage seal support assembly to receive a static-static seal 48. An extension 52 extends from the brush seal holder 51 on which a brush seal 55 is secured. The brush seal holder 51 is made of silicon carbide, Nilo Alloy-K, or CMC to provide for an extremely low coefficient of thermal expansion compared to the low CTE of the seal holder assembly 41 and 42. The brush seal holder 51 is also formed from two 180 degree segments that together form a full 360 degree annular ring to hold the brush seal 55. The encapsulating arrangement provides for the brush seal holder 51 to be exposed to near zero thermal gradients during engine operation to eliminate possible thermal gradients which cause thermal stresses. This means that the hot gas flow that surrounds the brush seal holder 51 surrounds the brush seal holder 51 such that thermal gradients across the sides of the holder 51 are minimized. This limits the thermal stress developed on the brush seal holder 51 which is important for this very brittle and delicate material. Trapping an extremely low CTE material in an INCO 909 housing for brush seal applications allows for the brush seal to not rub the rotor during transients and especially during hot restarts where brush seal wear is especially excessive. Therefore, a longer life for the brush seal can be accomplished.

Figure 2:
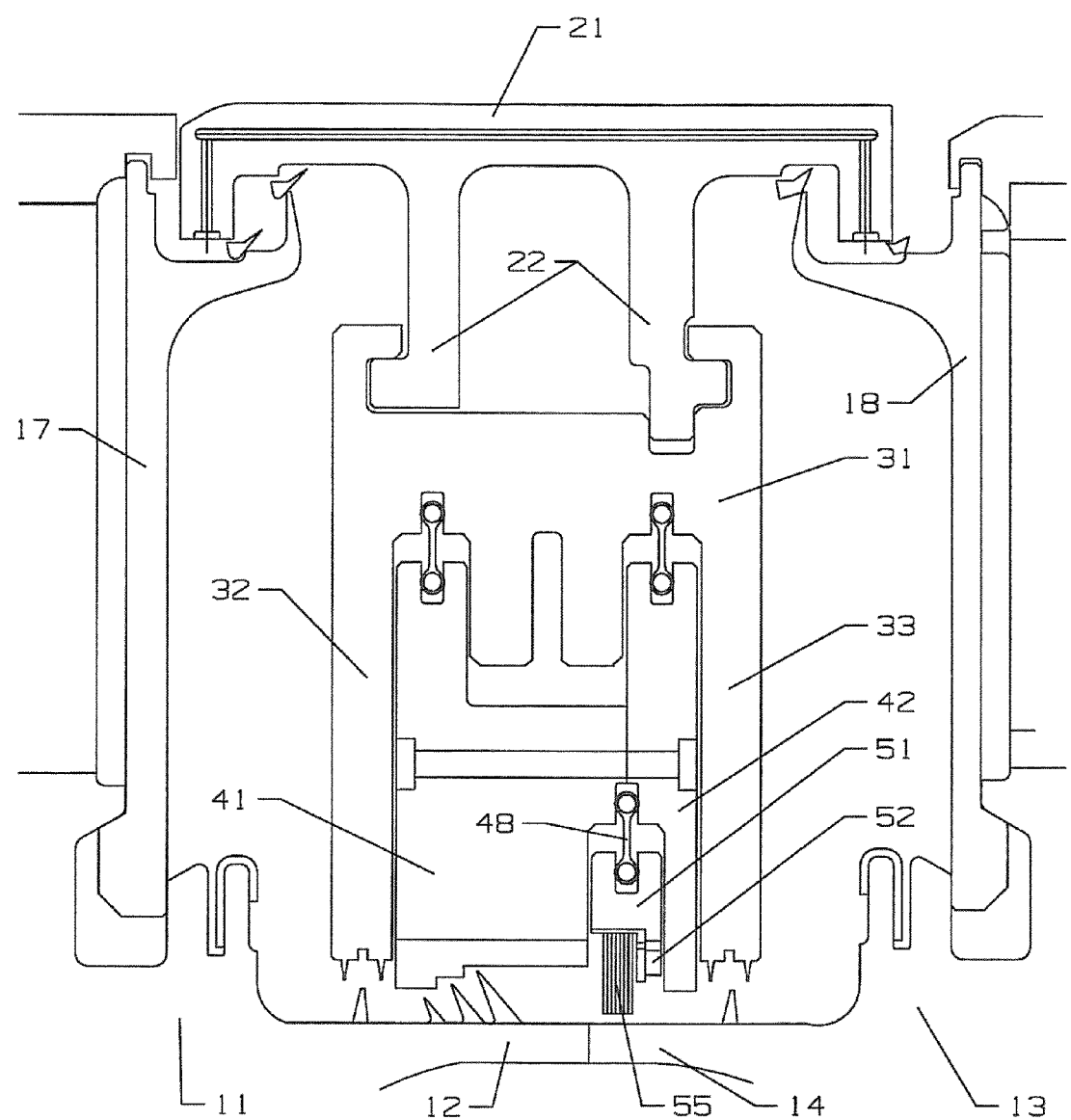
FIG. 2 shows a cross section view of the brush seal for the second embodiment of the present invention.

FIG. 2 shows a second embodiment of the present invention in which the forward floating interstage seal support 41 is wider than the aft floating interstage seal support 42 so that the brush seal holder 51 and the brush seal 55 is positioned farther aft in the engine than in the first embodiment of FIG. 1.

FIG. 3 shows a third embodiment of the radial seal of the present invention. The stationary inner shroud 21 of the stator vane includes two hooks 22 that extend radially inward toward the rotor shaft as in the other embodiments. A segmented fixed interstage seal support assembly 61 is secured to the inner shroud hooks 22 as seen in FIG. 3. Two seals 77 secured in annular grooves of the hooks 22 form a seal between the hooks and the interstage seal support assembly segments 61. The interstage seal support assembly 61 includes a large annular inward facing groove 62 in which an outer and an inner floating seal support is mounted.

The floating seals include an annular outer floating seal support 66 that is formed of two halve sections in which each of the two halve sections are formed of two 180 degree segments that form a full 360 annular ring. The outer floating seal support 66 also defines a smaller annular inward facing groove 68 in which an annular inner floating seal support 64 is mounted. The 180 degree segments that form the outer floating seal supports 66 is secured together by bolts 67 that extend in a circumferential direction where the two 180 degree segments are joined together.

The annular inner floating seal support is also formed from two halve sections each of which is formed from two 180 degree segments. These two 180 degree segments are also bolted together with circumferential arranged bolts like in the outer floating seal support 66. The inner floating seal support 64 also includes bolt holes 65 that receive bolts that secure the two annular ring halves together and tightly secure the brush seal or a leaf seal assembly 63 between the inner floating seal supports 64. For the brush seal 63, any compliant seal would work that can withstand the temperatures of operating in the engine. The inner floating seal support 64 is made from a very low alpha material (low CTE, or coefficient of thermal expansion) such as Silicon Carbide or a ceramic material. These extremely low alpha materials are typically very brittle and delicate materials that can easily crack due to load stress or thermal stress. However, using an extremely low alpha material for the inner floating seal support will result in minimal radial growth during transients of the engine so that the brush seal 63 does not wear while maintaining the low clearance gap for the brush seal 63. The purpose of the outer floating seal support 66 is to fully encapsulate the inner floating seal support 64 so that any high temperature gas flow leakage that occurs in this area will fully cover all around the inner floating seal support which is made from the delicate and brittle material. This will significantly limit the thermal stress of this material. The inner floating housing halves 64 are protected by the outer floating housing halves 66. The inner floating seal assembly 64 floats in a radial direction within the outer floating seal assembly 66 while the outer floating seal assembly 66 floats in a radial direction within the annular groove formed within the interstage seal support assembly 61. Thus, one floating seal assembly is formed within another floating seal assembly.

On an opposite side of the interstage seal support 61 from the floating brush seal assembly is a coolant chamber 72 that is supplied with pressurized cooling air from passages within the stator vane and interstage seal support 61 that is sued as purge flow air to adjacent rotor cavities. A plate 73 is secured to the interstage seal support 61 to enclose the coolant chamber 72. An annular arrangement of swirl holes 74 is positioned in the cover plate 73 to discharge the purge flow into the rotor cavities. A stepped honeycomb seal surface 75 is secured onto a bottom surface of the interstage seal support 61 upstream from the brush seal 63 to form a labyrinth seal with teeth from a conventional seal that forms a transient seal assembly.

With the present invention of the above three embodiments, a large clearance at the start of the engine with not allow high leakage flow because the lab seals will close down and make contact with the rotor shaft during the startup. The lab seals are closing down onto the rotor shaft while the brush seal maintains a large transient gap. As the rotor shaft heats up during engine startup, the stator inner shroud also heats up causing the lab seal clearance to open while the brush seal clearances closes due to its fixed position and because of its extremely low alpha material. Thus, no wear of the brush seal 63 occurs during engine transients due to the structure and operation of the present invention. The brush seal assembly of the present invention can make use of the very low alpha materials that are very brittle and delicate while being able to withstand the high engine operating conditions due to being encapsulated within the outer floating seal assembly 66.

We claim the following:

1. An interstage seal assembly in a gas turbine engine comprising:
   a segmented fixed interstage seal support secured to a stationary inner shroud of a stator vane;
   a larger radial inward facing annular groove formed within the interstage seal support;
   an outer floating seal assembly secured within the larger radial inward facing annular groove such that radial displacement of the outer floating seal assembly can occur within the larger radial inward facing annular groove;
   the outer floating seal assembly forming a smaller radial inward facing annular groove;
   an inner floating seal assembly secured within the smaller radial inward facing annular groove such that radial displacement of the inner floating seal assembly can occur within the smaller radial inward facing annular groove; and,
   an annular compliant seal secured to the inner floating seal assembly to form a seal with a rotor disk of the gas turbine engine.

2. The interstage seal assembly of claim 1, and further comprising:
   the inner floating seal assembly is made of a very low alpha material.

3. The interstage seal assembly of claim 2, and further comprising:
   the very low alpha material is Silicon Carbide.

4. The interstage seal assembly of claim 2, and further comprising:
   the very low alpha material is a ceramic material.

5. The interstage seal assembly of claim 2, and further comprising:
   the larger annular groove in the outer floating seal assembly encapsulates the inner floating seal assembly such that a minimal thermal stress occurs on the inner floating seal assembly.

6. The interstage seal assembly of claim 1, and further comprising:
   the inner floating seal assembly is formed of two halve sections with each halve section made from two 180 degree segments.

7. The interstage seal assembly of claim 1, and further comprising:
   a seal to form a seal between each of the outer floating seal halves and the interstage seal support.

8. The interstage seal assembly of claim 7, and further comprising:
   the two seals are secured within two annular radial inward facing grooves that allow for the two seals to be displaced in the radial direction when the outer floating seal assembly moves in the radial direction with respect to the interstage seal support.

9. The interstage seal assembly of claim 1, and further comprising:
   the compliant seal is secured between two annular seal halves; and the two annular seal halves are secured between the two annular seal halves of the inner floating seal assembly.

10. The interstage seal assembly of claim 1, and further comprising:
    a labyrinth seal forming a second seal between the rotor disk and the interstage seal assembly in series with the compliant seal.

11. The interstage seal assembly of claim 10, and further comprising:
    the labyrinth seal includes a stepped honeycomb surface extending from the interstage seal assembly and a plurality of teeth extending from the rotor shaft toward the honeycomb surface.

* * * * *

UNITED STATES PATENT AND TRADEMARK OFFICE
CERTIFICATE OF CORRECTION

PATENT NO. : 8,133,014 B1
APPLICATION NO. : 12/542495
DATED : March 13, 2012
INVENTOR(S) : Todd A. Ebert and John A. Carella Page 1 of 1

It is certified that error appears in the above-identified patent and that said Letters Patent is hereby corrected as shown below:

In the Specifications:

Col. 1, lines 11-14, should read:

This invention was made with Government support under contract number DE-FC26-05NT42644 awarded by Department of Energy. The Government has certain rights in the invention.

Signed and Sealed this
Thirteenth Day of August, 2013

Teresa Stanek Rea
*Acting Director of the United States Patent and Trademark Office*